United States Patent [19] [11] 3,974,312
Stevens et al. [45] Aug. 10, 1976

[54] ARTIFICIAL TENNIS-PLAYING COURT AND PROCESS
[75] Inventors: James Stevens, Marietta; David K. Slosberg, Atlanta, both of Ga.
[73] Assignee: Pandel-Bradford, Inc., Lowell, Mass.
[22] Filed: June 9, 1975
[21] Appl. No.: 585,060

[52] U.S. Cl. .................................. 428/91; 26/29 R; 26/29 P; 28/72 P; 28/74 P; 428/17; 428/62; 428/95; 428/96; 428/97; 428/310; 428/311; 428/313
[51] Int. Cl.² ................. C08G 41/100; B32B 5/16; B32B 27/40
[58] Field of Search .................. 428/17, 62, 85, 91, 428/95, 96, 97, 310, 311, 313, 315; 26/2 R, 29 R, 29 P; 28/72 FT, 72 P, 72.1, 72.16, 74 P, 75 R

[56] References Cited
UNITED STATES PATENTS
3,801,421  4/1974  Allen .................................... 428/96

Primary Examiner—Marion E. McCamish
Attorney, Agent, or Firm—Richard P. Crowley

[57] ABSTRACT

An artificial tennis-playing court surface which comprises a flat, woven, fiber-glass, base sheet, one surface of the sheet characterized by a plurality of napped, generally upright, glass fibers and a layer of a cross-linked resin bonded to the upper surface, the resin forming a coating about and between the napped glass fibers to provide a rough, resin, fiber-coated surface, and a backing sheet secured to the opposite surface of the fiber-glass base sheet. A process of manufacturing an artificial tennis court-playing surface, which process comprises: napping the surface of a woven fiber-glass base sheet to provide a napped surface comprising a plurality of fine glass fibers protruding therefrom; coating the napped surface with a thin layer of a cross-linkable resin to coat the napped fibers and between the napped fibers; and securing a backing sheet to the fiber-glass base sheet.

28 Claims, 4 Drawing Figures

ARTIFICIAL TENNIS-PLAYING COURT AND PROCESS

BACKGROUND OF THE INVENTION

A variety of artificial surfaces have been proposed for recreation and sport purposes, and particularly artificial surfaces have been proposed for tennis-playing court surfaces. Such surfaces have in the past fallen into two general groups, the first group composed of artificial surfaces which attempt to simulate a grass-like surface with the employment of polymeric filaments secured to a base sheet, somewhat in the nature of a tufted or pile carpet. Other surfaces, particularly tennis surfaces, have encompassed the employment of a resin or polymeric-coated layer on a base sheet to provide a permeable or nonpermeable flat, relatively smooth surface, such surface depending upon the nature of the use, whether indoor or outdoor, and the nature of the sport or recreation or activity, and have employed both solid and foam backing layers.

Tennis court-playing surfaces have recently been proposed employing an open-cell, polyvinyl chloride, resin layer as the backing layer in order to provide for a proper resilience and ball-bounce characteristics. The latter classification of tennis-playing surfaces has included the use of a woven, fiber-glass sheet on which has been coated a vinyl resin plastisol containing glass microspheres and a polyvinyl chloride, open-cell, backing layer, either bonded thereto or separate, to provide for a surface having the desired tennis ball skid and spin characteristics and bounce height. The latter artificial surface has been characterized by a relatively smooth flat surface which in part reflects the design of the underlying, woven, fiber-glass, base sheet material. In addition, such surfaces should be abrasion-resistant, have low maintenance properties, be of low cost and easy to install, and preferably are waterproof or nonpermeable where they are employed in outdoor courts or conditions. Additionally, it is often desirable that such surfaces be dimensionally stable under a variety of heat and weather conditions such that the playing characteristics of the surface will not be altered with use, time and temperature changes.

Prior art artificial surfaces, and particularly tennis-playing court surfaces, have not been wholly satisfactory, particularly as regards cost and dimensional stability of the surface, since often, during the process of manufacture or under weather conditions or with time, the playing characteristics of the surface or the dimensional stability of the artificial surface have varied. These disadvantages of present-day artificial surfaces are well known and recognized.

SUMMARY OF THE INVENTION

Our invention is directed to improved artificial surfaces, particularly recreational surfaces, such as surfaces which may be employed in tennis courts, or for general purposes where nonskidresistant, low-wear surfaces are desired, and to the process of preparing such surface materials. In particular, our invention relates to an artificial tennis court surface characterized by high dimensional stability and good playing characteristics, and which surface is characterized by a plurality of resin-coated, napped, glass microfibers to provide for a rough, random, uniform playing surface. More particularly, our invention is directed to a process of preparing such artificial tennis-playing court surfaces, wherein a highly dimensionally stable surface containing a foam-backing layer is provided.

Our artificial surfaces comprise a generally flat, woven, fiber-glass, base sheet, the surface of which is characterized by a plurality of napped, generally upright, fine, generally uniform, random, glass fibers protruding therefrom, and a polymeric layer bonded to the upper surface, the polymer forming a coating about and between the napped glass fibers to provide for a rough, resin, fiber-coated surface. Preferably, the polymeric layer employed is a flexible, thermoset or cured resin layer, such as of carboxylated vinyl chloride resin, and preferably, the artificial surface has a backing sheet secured to the opposite surface of the base sheet, such as a solid or cellular foam layer.

The process of preparing our artificial surface material comprises napping the surface of a woven fiber-glass base sheet to provide for a generally uniform napped surface of fine microfiber glass protruding from the surface, and then afterwards, coating the napped surface with a thin layer of a polymer in an amount sufficient to coat the raised napped fibers, and also between the napped fibers to provide for a rough, polymeric-coated surface.

The base sheet employed in our invention comprises a glass-fiber sheet, particularly a fibrous, woven sheet of glass fibers, typically having a thickness of from about 2 to 20 mils; e.g., 8 to 12 mils. A variety of different weave and surface design properties may be employed. The fiber-glass base sheet provides for a tough, high-strength, chemically inert, dimensionally stable material, and does not significantly change in response to heat or moisture. The base sheets of polymeric or natural or synthetic fiber material, such as those nylon and olefinic fibers; e.g., polypropylene, are not preferred or wholly satisfactory in that they fail to have the high strength, chemical inertness and dimensional stability of fiber glass. Further, the employment of the fiber-glass base sheet on the subsequent napping operation provides for very ultrafine, raised, napped, fine, glass fibers on the surface thereof.

The fiber-glass base sheet may be napped in a variety of ways, but typically in one embodiment by brushing the surface with hard, stiff bristles in order to provide for a generally uniform napping of the fiber glass across the sheet, the napped fibers ranging generally from 1/32 to ¼ of an inch or slightly greater in length. On napping, the napped microglass fibers tend to assume a generally upright or straight position in a generally uniform manner across the sheet due in part to the nature of a static charge on the fiber-glass base sheet occasioned by the napping operation. The texture of the napped surface may be varied by varying the type of bristles employed in the brushing operation by the speed of the napping or brushing operation and by the direction of rotation or movement of the base sheet in relationship to the brushing operation. In one preferred embodiment, the woven fiber-glass base sheet is napped by employing a countercurrent rotating brush having hard polymeric bristles, such as bristles of nylon.

After napping and optionally in the preferred embodiment, any residual dirt, broken fibers, loose threads or the like may be removed or displaced from the napped surface, such as by employing a vacuum extending across the napped surface, which not only provides for removal, but also aids in providing a generally upright, uniform surface of napped fine fibers. If desired and optionally, a static charge may be imparted to the napped fibers in order to provide for a generally uniformly upright position of the fibers. Such static charge may be applied to the surface by a corona discharge or by other techniques well known in the art.

After napping, the microfiber woven glass sheet is coated with a thin resin layer typically ranging from about 2 to 25 mils; for example, 5 to 20 mils, in thickness, and in any event, in an amount sufficient to coat the napped fibers and to coat between the fibers to form an abrasion-resistant, generally nonpermeable, waterproof resin or polymeric surface. The resin or polymeric composition employed may contain pigments, for example, to reduce cost and/or provide an artificial grass or other color of red, green, brown, etc. to the top surface.

The resin composition may be employed by using a number of coatng techniques, such as a doctor knife, opposing rollers or a floating doctor knife, with a constant tension on the base sheet material. Typically, the resin composition may vary in viscosity, but generally has a viscosity ranging from about 2000 to 35000 cps; e.g., 10,000 to 25,000 cps. A wide variety of polymer and resin compositions may be employed for the coating, such as, for example, vinyl chloride plastisols, urethanes, acrylics and the like. Such compositions may contain other additives, such as plasticizers, fillers, dyes, pigments, antioxidants, stabilizers, cross-linking and curing agents, thickeners, surfactants, wetting agents, blowing agents, flame retardants and other additives. Although thermoplastic resin materials may be employed, they are not the preferred embodiment, since such materials, on subsequent processing, such as the adhering of a backing coat to the base sheet under heat and pressure, cause variations in the surface coating, or with high temperatures and time tend to change the playing characteristics of the surface.

In the preferred embodiment of our invention and to provide a highly, commercially stable, artificial surface material, the resin and polymeric compositions employed should be a composition with thermosetting cross-linkable or curable qualities, such as, for example, a cross-linkable material such as a urethane resin, a cross-linkable acrylic resin, through the use of cross-linking agents or by ultraviolet radiation in the presence of a photo initiator, an unsaturated acrylic resin and a difunctional and monofunctional acrylic resin, or even more preferably a carboxylated vinyl-halide resin, such as a vinyl-chloride, vinyl-acetate or polyvinyl-chloride carboxylated resin. The vinyl resin may contain a fully 100% carboxylated vinyl-chloride resin or modified to as low as about 20% of carboxylated vinyl-chloride resin, with a conventional vinyl-chloride resin depending upon the cost and stability and other properties desired.

The cross-linkable or curable resin or polymeric material is supplied in liquid form and generally at low plasticizer levels in order to provide for excellent tensile strength and toughness and abrasion resistance to the surface. Such curable and cross-linkable resin compositions may contain suitable amounts of cross-linking agents, such as peroxides, curing agents or photo initiators where ultraviolet or other radiation techniques are employed. Cross-linking or curing can be effected by heating or by exposure to irradiation, such as ultraviolet or atomic particles or a combination thereof. Such cross-linkable materials may be employed alone or in combination with other natural, synthetic or elastomeric materials, such as ethylene diene-conjugated rubbers, such as natural rubber, acrylonitrile butadiene rubber, nitrile rubber, butyl rubber, polyisoprene and the like. Such materials employed should have the ability to bond securely to the fiber-glass woven base sheet and to coat the individual napped fibers.

The resin coating may be of a solid, or more desirably of a very high-density, foam layer. We have found that it is preferable to form a high-density foam layer, both in coating the fibers and particularly between the fibers, in that such layer, on wearing during use, provides for a rough, irregular surface, and, therefore, provides continuity in the playing characteristics of the surface. A high-density foam layer; for example, a foam density of less than about 60 pounds per cubic feet; e.g., 60 to 80 pcf, may be obtained through the employment of incorporating air or other gas mechanically into the resin composition, or through the use of small amounts of blowing agents, or through the employment of liquids, such as low volatility liquids such as solvents, diluents, fluorocarbons and the like. In the preferred embodiment, a substantially closed-cell, high-density, foam layer is desired; e.g., over 90% closed cells. In addition, the use of an open or closed foam layer provides for additional foot comfort, and contributes also to the good playing characteristics of the surface.

After coating the resin or polymeric composition is cured or cross-linked, such as by the use of ultraviolet light or preferably by heating to a temperature sufficient to cure or cross-link the coating into a hard, tough, abrasion-resistant surface coating. The temperature employed may vary, but, for example, where carboxylated vinyl-chloride resins are employed, either alone or with other resins, such as vinyl-chloride resins, amino plast resins, such as amido compounds like melamine-formaldehyde condensates, having temperatures of 300° to 350°F, may be employed; e.g., 1.0 to 10 parts, to cross-link the carboxylated vinyl-chloride plastisol resin layer. Suitable carboxylated compositions, both solid and foamable, are set forth in U.S. Pat. No. 3,661,691, issued May 9, 1972, which is hereby incorporated by reference, and other patents.

The artificial surface material so prepared may be immediately back-coated or if desired stored for subsequent back-coating, or even for use directly on a playing surface where a separate back-coating surface of solid or foam layer is to be employed. Preferably, a cellular, prticularly a closed-cell, foam layer from about 0.50 inch to 0.125 inch is desirable in order to provide a tennis-playing court of desired ball bounce and resiliency to provide the desired foot comfort, while the foam thickness may vary for other surfaces, e.g., up to 0.50 inch. Solid backing materials, while they may be employed, often lead to increased weight and are more difficult to handle, and result in substantially more cost and considerably less foot comfort, and do not provide the desired ball rebound when the surface is for tennis or other ball-playing activities.

In the preferred embodiment, a closed-cell foam layer is secured to the back surface of the artificial surface material. We have found in particular that, where a thermoplastic material is employed as the resin or polymeric coating or the artificial surface, subsequent attempts to secure a backing layer onto the artificial surface with the use of heat or pressure, or a combination thereof, often result in some undesirable alteration of the artificial surface due to the thermoplastic and flow qualities of the resin employed with age and temperature. Therefore, in our preferred embodiment, it is desired that a more thermoset material be employed on the artificial surface so that subsequent bonding of the backing layer to the artificial surface may take place in a normal manufacturing process without altering the face surface, while such thermosetting properties of the face surface provide for greater dimensional stability over long-term usage.

The solid or foam flexible polymeric backing layer may be secured to the back surface through the use of a wide variety of techniques, and preferably by the use of an adhesive tie-in coating layer on the back surface, but more particularly, where a closed-cell polyvinyl foam layer is employed by the technique as set forth in U.S. Pat. Nos. 3,560,284, issued Feb. 2, 1971 and 3,698,973, issued Oct. 17, 1972, incorporated by reference herein, wherein a foam surface is bonded to a back surface through the melting of a thin film on the surface of the foam layer. The thin film forms a thin, continuous, adhesive, barrier layer between the back surface of the woven fiber-glass base sheet and the secured foam layer. However, it is recognized that a wide variety of other adhesive tie-coat layers may be employed to secure the back surface to the woven fiber-glass sheet. The tie-coating adhesive layer employed should provide for a good bond between the back of the woven glass sheet and the backing sheet. Further, such material should also serve as a barrier layer to the passage of alkaline moisture into contact with the glass-fiber base sheet.

We have found in particular that prior attempts to employ fiber-glass base sheets in artificial surfaces, particularly for outdoor use, where the surface has been employed on the ground or over concrete, have been unsatisfactory, particularly with open-cell foam layers which permit the passage of moisture, due to the migration of alkaline moisture into contact with the fiber-glass base sheet, leading to the rapid deterioration of the fiber-glass base sheet. The use of a tie-coating or barrier layer, for example, having a thickness of from 0.5 to 5 mils, protects the glass-fiber base, and, by coating the back surface of the glass fibers, prevents its deterioration. Vinyl plastisol or urethane resin tie layers, either thermoplastic or cross-linked vinyl-chloride resins, are preferred.

After securing of the backing sheet to the artificial surface material, it is often desirable to emboss the free surface of the backing sheet with a desired pattern, such as by passing the material through a heated embossing roll, so as to permit the backing sheet to provide a skid-resistant design surface, and also to heat the final product and remove any stresses so as to permit the surface material to lie flat. Typically, post-annealing of the material is desirable by heating the material, or preferably by passing the material through an embossing roll with the foam layer at a temperature of from about 250° to 325°F. This post-annealing and embossing technique is most desirable where the backing sheet has been secured to the surface material at lower or different temperatures than the fusing or cross-linking temperature of the resin or polymeric composition surface. By subjecting the material to a post-annealing operation, the material is relieved of stresses and tends to lie flat during use.

The open-cell foam-backing layer preferably employed in our invention may be composed of a wide variety of materials, but typically is a substantially closed-cell, flexible, foam layer having a density ranging from about 12 to 60 pounds per cubic feet, and of high resiliency, which foam layer may be formed of urethane resin, vinyl-chloride or carboxylated vinyl-chloride resin, a natural or synthetic elastomeric material or other foamed material.

Where our artificial surface material is employed as a tennis court, individual panels of the appropriate width and length of the material are formed and placed upon a surface in the form of a tennis court. The panels may be secured together by the use of adhesive or solvent-type tape, or other means, to form the court or other recreational sport surface or covering.

For the purpose of illustration only, our invention will be described in connection with the preparation of an artificial surface suitable for use as a tennis-playing court; however, it is recognized that a number of variations and modifications within the spirit and scope of our invention may be made without departing therefrom.

DESCRIPTION OF THE EMBODIMENTS

Figure 1:
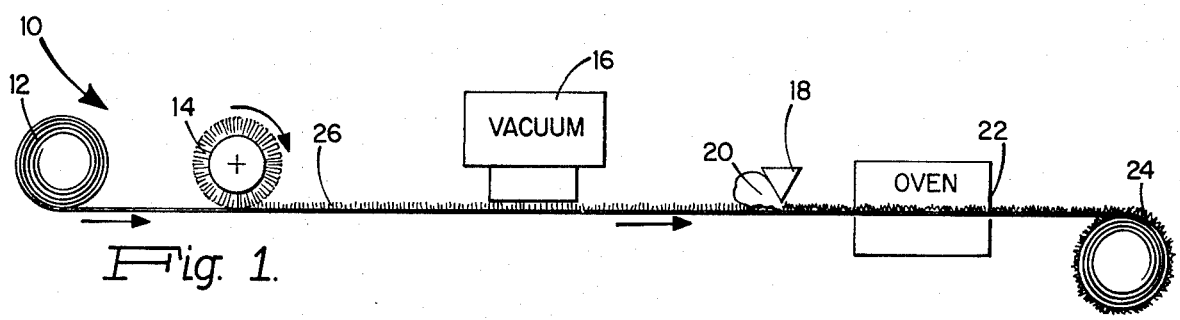
FIG. 1 is a schematic illustrative process of the production of an artificial surface material of our invention.

FIG. 1 illustrates our process 10 wherein a woven, glass-fiber sheet of a crow-foot satin pattern 12 having a thickness of about 10 mils is passed under a rotating brush having nylon bristles 14, the bristles of the brush adapted to contact at the upper surface of the glass-fiber sheet 12 as the fiber sheet moves in a direction countercurrent to the rotation of the brush 14 to provide a generally uniform raised napped surface of ultra-fine microglass fibers 26. After napping, a vacuum 16 is employed to remove dirt, loose threads and broken fibers from the surface. Thereafter, a layer of about 6 to 25 mils of a cross-linkable carboxyl vinyl-chloride resin organosol 20 containing a small amount of mineral spirits is coated onto the surface with a floating knife blade 18. The mineral spirits are used in the formulation to impart a very high-density cellular structure in the thicker sections of the top coat; that is, between the napped glass fibers, and to provide resilience to minimize the effects of abration during subsequent usage of the artificial surface. The carboxylated vinyl resin employed provides for a tough heat-resistant and abrasion-resistant top surface. After coating, the resin-coated fibers and base sheet are passed through a fusion and cross-linking oven 22 at a temperature of approximately 300° to 375°F to effect cross-linking of the carboxylated vinyl resin to form a tough, dimensionally stable top surface. Thereafter, the product 24 is placed into roll form for subsequent application of a back coating.

A typical high-viscosity vinyl resin composition to be applied is as follows:

TABLE I

| Ingredients | Description | Parts by Weight |
|---|---|---|
| Geon 130 × 17 | Carboxylated vinyl-chloride resin | 100 |
| PEG 400 | Polyethylene glycol monolaurate wetting agent | 1 |
| Cymel 301 | Amino plast cross-linking agent heat-activated amide resin | 5 |
| Calcium Carbonate | Filler | 10 |
| Epoxy Soya | Heat stabilizer | 4 |
| Alkyl Phthalate; e.g., Dioctyl Phthalate | Primary plasticizer | 56 |
| Butyl Benzyl Phthalate | Plasticizer | 10 |
| Dibasic Lead Phthalate | Stabilizer | 3 |
| Pigment | | As required |
| Odorless Mineral Spirits | Blowing agent and diluent | 9 |
| | TOTAL | 198 |
| Viscosity 20 to 25,000 cps | | |

The formulation set forth in Table I is a 100% carboxylated resin, but similar formulations with 0 to 80% of other compatible resins like vinyl-chloride paste resin plastisols may be used.

Figure 2:
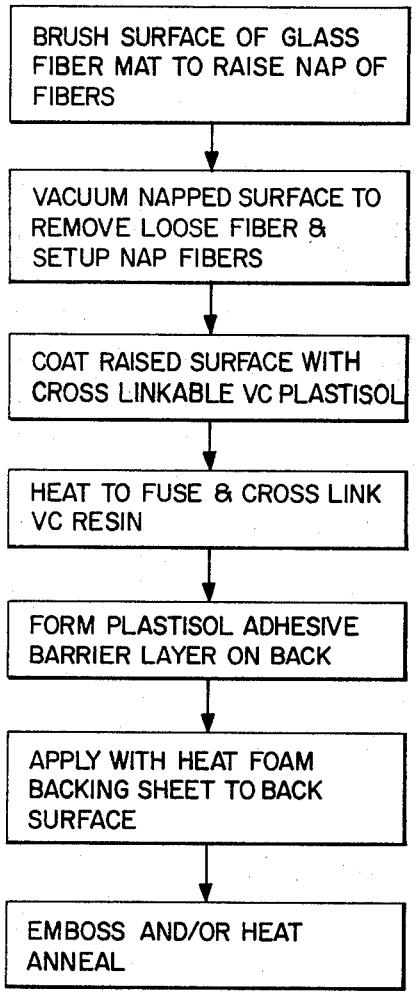
FIG. 2 is a schematic block flow process diagram of the steps of preparing our artificial tennis-playing court material.

FIG. 2 illustrates in block diagram from the steps of preparing our foamed-back artificial tennis-playing court surface, which includes brushing the surface of a woven glass-fiber mat to raise the nap of the glass fibers, and optionally thereafter, vacuuming the napped surface to remove loose fibers and to set up the napped fibers for coating. The napped surface is coated with a heat cross-linkable vinyl-chloride plastisol or organosol, and thereafter heated to cross-link and to fuse the vinyl chloride. Thereafter, a back coating, such as a foam backing such as a polyvinyl chloride or a carboxylated vinyl-chloride cross-linked back coating, is applied by using a preformed coating layer or casting directly onto the back surface of the woven glass fibers, and preferably a tie and barrier adhesion coat applied, such as of a vinyl-chloride plastisol, to prevent the disintegration of the glass fibers by alkaline moisture. A chemically expanded vinyl foam laminated to the back surface of the coated fiber-glass base sheet is carried out at an elevated temperature, and typically under pressure, such as by passing through heated embossing rolls, to provide a uniform back thickness. The back surface may then be post-annealed by heating so that the surface coating lies flat, and may be embossed by passing through cooled embossing rolls.

Figure 3:
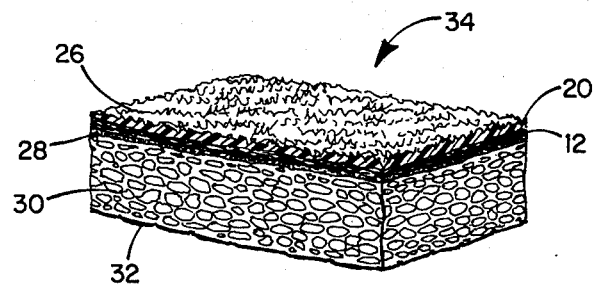
FIG. 3 is an enlarged fragmentary schematic cross-sectional perspective view of the artificial surface material of our invention.
Figure 4:
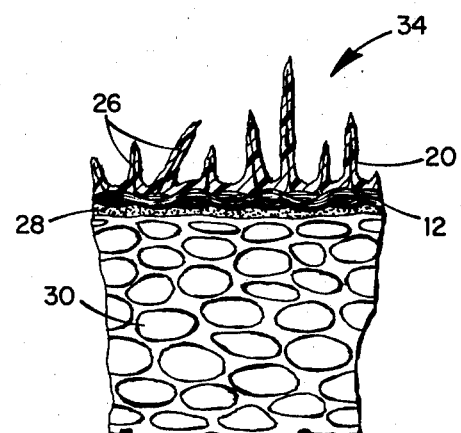
FIG. 4 is a schematic illustrative enlarged representative view of a portion of the material of FIG. 3.

FIG. 3 shows a substantially closed-cell chemically blown foam back-coated artificial surface having vinyl-chloride resin-coated raised napped glass fibers on the surface 26 thereof to provide a rough, fiber, tennis-playing surface 34, with a cross-linked vinyl-chloride coating layer 20 between the vinyl-chloride-coated raised glass fibers 26. The coating layer 20 is secured to a woven glass-fiber mat 12, with the back surface containing a polyvinyl chloride fused adhesive barrier layer 28 and a flexible, closed-cell, polyvinyl foam backing layer 30 secured to the barrier layer 28 to the back surface of the woven glass mat 12, and with the foam backing 30 having an embossed surface design 32 to provide for skid resistance.

The cross-linked carboxylated vinyl-chloride-coated napped fiber-glass surface with the vinyl-chloride plastisol barrier layer and secured closed-cell foam vinyl-chloride backing sheet provides for a highly dimensionally stable recreational surface, particularly for tennis court use, which provides for the desired ball bounce, skid resistance and ball spin which are desired by tennis players, and overcomes many of the disadvantages of the prior art surface coatings. Such surface court in use, particularly over a concrete base, provides for superior alkaline resistance, forms a low-maintenance, easily installed, low-cost, waterproof, nonpermeable playing surface for a variety of purposes.

What is claimed is:
1. An artificial surface material which comprises:
   a. a flat, woven, fiber-glass, base sheet material, one surface of which is characterized by a plurality of napped, generally upright, fine, glass fibers protruding therefrom;
   b. a layer of a nonpermeable, abrasion-resistant resin forming a coating about the raised, napped, glass fibers and between the fibers to provide a rough, resin, fiber-coated, random face surface; and
   c. a backing sheet secured to the other surface of the base sheet.
2. The surface material of claim 1 wherein the backing sheet comprises a resilient, flexible, thermoplastic cellular layer.
3. The surface material of claim 1 wherein the backing sheet comprises a substantially closed-cell, vinyl-chloride resin layer.
4. The surface material of claim 3 wherein the foam layer is secured to the fiber-glass base sheet through a thin layer of an adhesive resin which inhibits the deterioration of the fiber-glass base sheet by alkaline moisture.
5. The surface material of claim 1 wherein the coating resin comprises a vinyl-chloride resin plastisol.
6. The surface material of claim 1 wherein the resin comprises a dimensionally stable, cross-linked, carboxylated, vinyl-chloride resin.
7. The surface material of claim 1 wherein the abrasion-resistant resin coating comprises a high-density closed-cell coating.
8. The surface material of claim 1 wherein the napped glass fibers have a height of about 1/32 to ¼ of an inch.
9. A tennis-court playing surface which comprises in combination:
   a. a flat, woven, fiber-glass, base sheet, one surface of which is characterized by a plurality of napped, generally upright, random, fine, glass fibers protruding therefrom;
   b. a nonpermeable coating layer of a cross-linked, crboxylated vinyl-chloride resin, the resin forming a coating about and between the napped glass fibers on the base sheet, and providing a rough, resin, fiber-coated surface;
   c. a thin layer of a fused vinyl-chloride resin on the back surface of the fiber-glass base sheet; and
   d. a vinyl-chloride, substantially closed-cell, foam layer secured to the barrier layer.
10. An artificial tennis-court playing surface which comprises a plurality of panels formed together to provide a tennis-court playing surface, the panels comprising:
   a. a flat, woven, fiber-glass, base sheet, the surface of which is characterized by a plurality of napped, generally upright, random, fine, glass fibers protruding therefrom;
   b. a layer of a nonpermeable, abrasion-resistant, waterproof resin forming a coating about the napped glass fibers and between the fibers to provide for a rough, resin, fiber-coated surface on the base sheet;
c. a layer of a resinous barrier and tie coat;
d. a backing sheet secured to the barrier tie-coat layer; and
e. a flat, concrete, base surface on which the artificial tennis-playing court surface is formed, the barrier coat preventing the deterioration of the fiber glass of the base sheet.

11. The artificial surface of claim 10 wherein the coating resin, the tie coat and back sheet are composed of a vinyl-chloride resin.

12. The artificial surface of claim 10 wherein the coating resin comprises a cross-linked, carboxylated, vinyl-chloride, resin, and the backing sheet comprises a vinyl-chloride closed-cell foam layer.

13. An artificial surface material for recreation and sports use which comprises:
a. a flat, woven, fiber-glass, base sheet, the surface of which is characterized by a plurality of napped, generally upright, random, fine glass fibers protruding therefrom;
b. a coating layer of a cross-linked, abrasion-resistant, dimensionally stable, resin material, the resin material coated about the napped glass fibers and between the glass fibers to provide a rough, resin, fiber-coated surface on the base sheet; and
c. a continuous barrier-coating layer on the opposite surface of the fiber-glass base sheet, the barrier-coating layer sealing the fiber-glass base sheet to prevent the deterioration of the sheet from alkaline moisture.

14. A process of manufacturing an artificial surface material, which process comprises:
a. napping the surface of a woven, fiber-glass, base sheet to provide a napped surface characterized by a plurality of random, generally upright, fine, glass fibers protruding from the surface thereof;
b. coating the napped surface with a thin layer of a resin-coating material to coat the napped fibers and between the napped fibers to provide a resin-coated, fibrous, rough surface; and
c. securing a backing sheet to the back surface of the fiber-glass base sheet.

15. The process of claim 14 which includes napping the surface of the fiber-glass base sheet by employing a rotating brush, the bristles of which are placed in contact with the base sheet.

16. The process of claim 14 wherein the base sheet is moved in a direction contrary to the rotary movement of the rotating bristle brush.

17. The process of claim 14 wherein the resin-coating composition comprises a cross-linkable, carboxylated, vinyl-chloride resin, and which process includes heating the resin-coated fibers and base sheet surface to a temperature sufficient to effect cross-linking of the carboxylated vinyl-chloride resin to provide an abrasion-resistant, rough, cross-linked resin composition.

18. The process of claim 14 which includes coating the back surface of the fiber-glass base sheet material with a thin adhesive barrier coating to protect the fiberglass base sheet from the deteriorating effects of alkaline moisture.

19. The process of claim 14 wherein the backing sheet comprises a foam layer.

20. The process of claim 19 wherein the foam layer comprises a substantially closed-cell vinyl-chloride foam layer.

21. The process of claim 14 wherein the resin-coated material is a carboxylated vinyl-chloride resin, and which includes the step of heating the carboxylated vinyl-chloride resin to provide a cross-linked, abrasion-resistant, resin composition, and which includes a continuous adhesive barrier layer of a vinyl-chloride resin to seal the back surface of the fiber-glass sheet from alkaline moisture, and wherein the backing sheet comprises a closed-cell, vinyl-chloride foam layer secured to the back sheet by the adhesive barrier layer.

22. The process of claim 14 which includes, after napping the surface and prior to coating, the step of removing loose threads and fibers from the napped surface of the fiber-glass base sheet prior to coating with the resin.

23. The process of claim 14 which includes, after napping and prior to coating, providing a static charge to the napped surface in order to provide for the uniformly upright position of the napped fiber-glass filaments.

24. The process of claim 14 wherein the coating resin includes a volatile liquid in the composition to provide for a high-density foam layer as the fiber-glass, resin-coated layer on the napped surface.

25. The process of claim 14 which includes heating the artificial surface material so prepared to a temperature sufficient to anneal the surface material from stresses, and to provide for a generally flat lay-down on the surface material.

26. The process of claim 14 which includes placing panels of the artificial surface material on a concrete base, and securing the panels together to form a tennis court-playing surface.

27. The process of claim 14 wherein the resin is a vinyl-chloride resin composition which contains from 20 to 100% of a carboxylated vinyl-chloride, cross-linkable resin.

28. A process of manufacturing panels useful as an artificial tennis court-playing surface, which process comprises:
a. brushing the surface of a woven fiber-glass base sheet to provide a napped surface composed of a plurality of generally uniform, random and upright napped glass fibers protruding from the surface thereof;
b. vacuuming the surface of the napped surface to remove loose debris therefrom;
c. coating the napped surface with a thin layer of a cross-linkable, carboxylated, vinyl-chloride resin composition in an amount sufficient to coat the napped fibers and to form a coating between the napped fibers, so as to provide for an abrasion-resistant, rough surface with the desired tennis ball-playing characteristics;
d. heating the coated napped base sheet to a temperature sufficient to cross-link the carboxylated vinyl-chloride resin to provide an abrasion-resistant, flexible, waterproof, resin, dimensionally stable surface;
e. forming a vinyl-chloride resin plastisol layer as an adhesive thin layer on the opposite surface of the fiberglass base sheet to coat the glass fibers and inhibit the deterioration of the fiber glass through alkaline moisture; and
f. bonding a vinyl-chloride substantially closed-cell foam layer to the adhesive and barrier layers.

* * * * *